United States Patent [19]
Weber et al.

[11] Patent Number: 5,273,735
[45] Date of Patent: Dec. 28, 1993

[54] PROCESS FOR THE PREPARATION OF SODIUM DICHROMATE

[75] Inventors: Rainer Weber; Bernd Rosenow; Hans-Dieter Block; Norbert Lönhoff, all of Leverkusen, Fed. Rep. of Germany

[73] Assignee: Bayer Aktiengesellschaft, Leverkusen, Fed. Rep. of Germany

[21] Appl. No.: 980,142

[22] Filed: Nov. 23, 1992

Related U.S. Application Data

[63] Continuation of Ser. No. 422,842, Oct. 17, 1989, abandoned.

[30] Foreign Application Priority Data

Nov. 3, 1988 [DE] Fed. Rep. of Germany ....... 3837266

[51] Int. Cl.$^5$ ............................................. C01G 37/14
[52] U.S. Cl. .................................... 423/596; 423/58; 423/61
[58] Field of Search .......................... 423/58, 61, 596

[56] References Cited

U.S. PATENT DOCUMENTS

| | | | |
|---|---|---|---|
| 3,027,245 | 3/1962 | Kearley | 423/596 |
| 3,137,541 | 6/1964 | Cooke | 423/596 |
| 3,305,463 | 2/1967 | Carlin | 204/89 |
| 3,933,972 | 1/1976 | Bauwens et al. | 423/58 |

FOREIGN PATENT DOCUMENTS

| | | | |
|---|---|---|---|
| 739447 | 7/1966 | Canada. | |
| 0047799 | 3/1982 | European Pat. Off. | |
| 113086 | 2/1898 | Fed. Rep. of Germany. | |
| 1173884 | 4/1960 | Fed. Rep. of Germany | 423/58 |
| 1093338 | 11/1960 | Fed. Rep. of Germany | 423/58 |
| 1205508 | 5/1962 | Fed. Rep. of Germany. | |
| 11900 | 2/1978 | Japan | 423/596 |
| 989314 | 4/1965 | United Kingdom | 423/596 |

OTHER PUBLICATIONS

Winnacker-Kuchler, Chemische Technologie (Chemical Technology), vol. 2, 4th edition, 1982, p. 657 to p. 664.

Primary Examiner—Gary P. Straub
Assistant Examiner—Steven Bos
Attorney, Agent, or Firm—Sprung Horn Kramer & Woods

[57] ABSTRACT

A process for the preparation of sodium dichromate and sodium dichromate solutions by alkaline oxidizing roasting of chromium ores, leaching resulting roast with water, adjustment of the pH to 7 to 9.5, removal of the insoluble constituents by filtration, a sodium monochromate solution containing 300 to 400 g/l of $Na_2CrO_4$ being obtained, conversion of the monochromate ions of this solution into dichromate ions by addition of an acid and/or by electrolysis and/or by reaction with carbon dioxide under pressure and crystallization of sodium dichromate by concentration of this solution. The improvement wherein before the conversion into a sodium dichromate solution, the sodium monochromate solution is concentrated to contents of 700 to 1000 g/l of $Na_2CrO_4$, the monochromatic ions, the solution is subsequently freed as far as possible from sodium sulphate by cooling to a temperature of below 0° C. and filtration, and the residual monochromate ions which remain in the solution are converted into dichromate ions by electrolysis and/or by reaction with carbon dioxide and/or with chromic acid.

7 Claims, 1 Drawing Sheet

PROCESS FOR THE PREPARATION OF SODIUM DICHROMATE

This application is a continuation, of application Ser. No. 422,842, filed Oct. 17, 1989, abandonded.

The invention relates to a process for the preparation of sodium dichromate and sodium dichromate solutions and to their use for the electrolytic preparation of chromic acid.

According to Winnacker-Küchler, Chemische Technologie (Chemical Technology), volume 2, 4th edition, 1982, page 657 to page 664, sodium dichromate is prepared by alkaline roasting of chromium ore with sodium carbonate and/or sodium hydroxide and atmospheric oxygen. Natural gas, heavy oil or coal dust are used as fuels for this process.

A sodium monochromate solution containing 300 to 500 g/l of $Na_2CrO_4$ is obtained by leaching the roast which leaves the furnace with water, adjusting the pH of the mash to 7 to 9.5 and separating off the insoluble constituents by filtration. The adjustment of the pH is as a rule carried out in this process with sulphuric acid and/or with sodium dichromate solution. To prepare sodium dichromate, the monochromate ions of the solution are converted into dichromate ions either by acidification with carbon dioxide under pressure or by electrolytic acidification. Sodium sulphate is formed on acidification with sulphuric acid, and precipitates out down to a residual content of about 0.5% by weight when the solution is concentrated to about 70% by weight of $Na_2Cr_2O_7.2H_2O$.

For acidification with carbon dioxide, the sodium monochromate solution is concentrated to a concentration of 750 to 1000 g/l of $Na_2CrO_4$ and saturated with carbon dioxide in an autoclave by feeding in carbon dioxide under a pressure of 4 to 15 bar, while cooling. An approximately 80 to 90% conversion of monochromate ions into dichromate ions is achieved here, sodium bicarbonate precipitating. The remaining conversion of up to 95 to 100% can be carried out in a further stage after concentration to 1300 g/l of $Na_2CrO_4$ ($Na_2CrO_7.2H_2O$ already formed expressed in $Na_2CrO_4$ equivalents) by feeding in carbon dioxide. It is also possible to perform the remaining conversion with sulphuric acid, chromic acid or by electrolysis.

According to U.S. Pat. No. 3,305,463, the electrolytic acidification is carried out by passing the sodium monochromate solution or the sodium monochromate solution which has been converted to the extent of 80 to 90% into sodium dichromate into the anode chamber of an electrolysis cell provided with a cation exchanger membrane. During the electrolysis, sodium ions migrate through the membrane into the cathode chamber of the cell, this chamber being filled with water or an aqueous solution. The sodium ions in this way form an aqueous solution containing sodium hydroxide with the hydroxide ions formed at the cathode, hydrogen being evolved. In the anode chamber, the monochromate ions are converted into dichromate ions by the hydrogen ions formed at the anode, with simultaneous evolution of oxygen.

To produce sodium dichromate crystals, the sodium dichromate solutions obtainable by the processes mentioned are concentrated by evaporating off the water. The sodium dichromate which then crystallizes is separated off and dried.

The sodium dichromate crystals and solutions obtainable in the processes described in all cases contain residual amounts of up to 0.5% by weight of sodium sulphate, and especially in the case of preparation by acidification with sulphuric acid and when sulphur-containing fuels are used for direct heating of the digestion furnace in the other preparation processes.

Because of their sodium sulphate content, such sodium dichromate solutions and sodium dichromate crystals are not very suitable or are even unsuitable for some intended uses, such as, for example, the preparation of highly pure chromium compounds and pigments and of highly pure chromium metal and the electrolytic preparation of chromic acid.

To prepare essentially sulphate-free sodium dichromate, U.S. Pat. No. 3,137,541 purposes concentration of the sodium dichromate solution, after acidification with sulphuric acid, to a content of about 70% by weight of $Na_2Cr_2O_7.2H_2O$, it being possible for the majority of the sodium sulphate contained therein to be crystallized out and separated off. The sodium dichromate solution which remains is then brought to a content of 67 to 68% by weight of $Na_2Cr_2O_7.2H_2O$ by adding water and is cooled to temperatures of $-7°$ to about $-23°$ C. Sulphate-containing contents of the solution crystallize out during this procedure, and are then removed from the cooled solution by filtration. After the filtration, sodium dichromate solutions which contain less than 0.1% by weight of sodium sulphate, based on the weight of $Na_2Cr_2O_7.2H_2O$ in the solution, are obtained. Sodium dichromate crystals with low sulphate contents—according to Example 5 0.015% by weight of $Na_2SO_4$, corresponds to 101 ppm of $SO_4^{2-}$—are obtained by concentration of this solution and crystallization.

This process has the disadvantage that sodium dichromate solutions with relatively low $Na_2Cr_2O_7.2H_2O$ contents can be freed only inadequately, if at all, from sodium sulphate.

The present invention now takes a different simple path for the preparation of sodium dichromate crystals and solutions of low sulphate content, the residual contents of sulphate in some cases even falling below those of the products obtainable by the process described in U.S. Pat. No. 3,137,541. In fact, it has been found, surprisingly, that residual sulphate contents of significantly less than 100 ppm of $SO_4^{2-}$ can be achieved by cooling sodium dichromate solutions with sodium monochromate contents of more than 1% by weight of $Na_2CrO_4$ to $-5°$ to $-25°$ C., it also being possible for solutions having sodium dichromate contents of only 50 to 66% by weight ($Na_2CrO_4$ contents calculated as $Na_2Cr_2O_7.2H_2O$ equivalents) to be essentially freed from sodium sulphate. Such solutions with sodium monochromate contents are obtained, for example, in industrial processes by acidification with carbon dioxide under pressure in the first stage, in which about 80 to 90% of the monochromate ions are converted into dichromate ions.

The present invention relates to a process for the preparation of sodium dichromate and sodium dichromate solutions by alkaline oxidizing roasting of chromium ores, leaching roast with water, adjustment of the pH to 7 to 9.5, removal of the insoluble constituents by filtration, a sodium monochromate solution containing 300 to 500 g/l of $Na_2CrO_4$ being obtained, if appropriate removal of polyvalent cations and vanadium by known processes, conversion of the monochromate ions of this solution into dichromate ions by addition of an acid and/or by electrolysis and/or by reaction with carbon dioxide under pressure and if appropriate crystallization of sodium dichromate by concentration of this solution, which is characterized in that before the conversion into a sodium dichromate solution, the sodium monochromate solution is concentrated to contents of 700 to 1000 g/l of $Na_2CrO_4$, the monochromate ions are then converted to the extent of 75 to 95% into dichromate ions, the solution is subsequently freed as far as possible from sodium sulphate by cooling to a temperature of below 0° C. and filtration, and the residual monochromate ions which remain in the solution are converted into dichromate ions by electrolysis and/or by reaction with chromic acid and/or with carbon dioxide, if appropriate after concentration of the solution.

In a preferred embodiment of the process according to the invention, the removal of the sodium sulphate is carried out by cooling to temperatures of $-5°$ C. to $-25°$ C.

It is advantageous for the conversion of the monochromate ions into dichromate ions in the sodium monochromate solution concentrated to contents of 700 to 1000 g/l of $Na_2CrO_4$ to be carried out the extent of 80 to 95%.

A variant of the process according to the invention in which the conversion of the monochromate ions into dichromate ions in the sodium monochromate solution concentrated to contents of 700 to 1000 g/l of $Na_2CrO_4$ is carried out by reaction with carbon dioxide under pressure and, after cooling and filtration, the residual monochromate ions present in the solution are converted into dichromate ions by electrolysis is particularly preferred.

The sodium dichromate crystals and solutions obtainable by the process according to the invention are distinguished by very low sulphate contents, it being possible for values of less than 0.025% by weight of sodium sulphate, based on the weight of $Na_2Cr_2O_7.2H_2O$, in the solution and in the crystals to be achieved.

Such products are outstandingly suitable for the preparation of highly pure chromium pigments and metal and of highly pure chromium compounds and for the electrolytic preparation of highly pure chromic acid.

According to CA-A-739,447, the electrolytic preparation of chromic acid is carried out in electrolysis cells separated by cation exchanger membranes. A solution of sodium dichromate is passed into the anode chambers of the cells and is converted into a solution containing chromic acid in that sodium ions are transferred selectively through the membrane into the cathode chamber.

In the course of the conversion of the sodium dichromate solution into sodium dichromate solution containing an increasing amount of chromic acid, the migration of the sodium ions through the membrane is increasingly accompanied by the migration of the hydrogen ions formed in the anode compartment, so that the utilization of the electric current for the desired operation of removal of sodium from the anode compartment, also called the current yield, decreases continuously. This means that complete conversion of the sodium dichromate into chromic acid is not possible in the anode compartment and for economic reasons only an average degree of conversion is aimed for. The chromic acid must then be separated off from these solutions by fractional crystallization. A mother liquor containing the sodium dichromate which has not yet been converted electrochemically and residues of chromic acid which has not crystallized out remains. This solution is expediently used again in the electrolysis process for further conversion into chromic acid.

This process principle results in the following problem: sulphates and other impurities which are introduced together with the sodium dichromate solution are accumulated in the system and in the end are discharged with and in the chromic acid crystals. If industrial sodium dichromate solutions are used, this means that the chromic acid obtainable by this process is heavily contaminated, in particular with sulphates. If sodium dichromate solutions which are prepared according to the invention and contain only small amounts of sulphate are used, on the other hand, a very pure chromic acid which is virtually free from sulphate is obtained.

BRIEF DESCRIPTION OF THE FIGURE

The process according to the invention is illustrated in more detail with the aid of FIG. 1. The variant of the process according to the invention described in FIG. 1 represents a particularly advantageous embodiment.

DETAILED DESCRIPTION OF THE FIGURE

Figure 1:
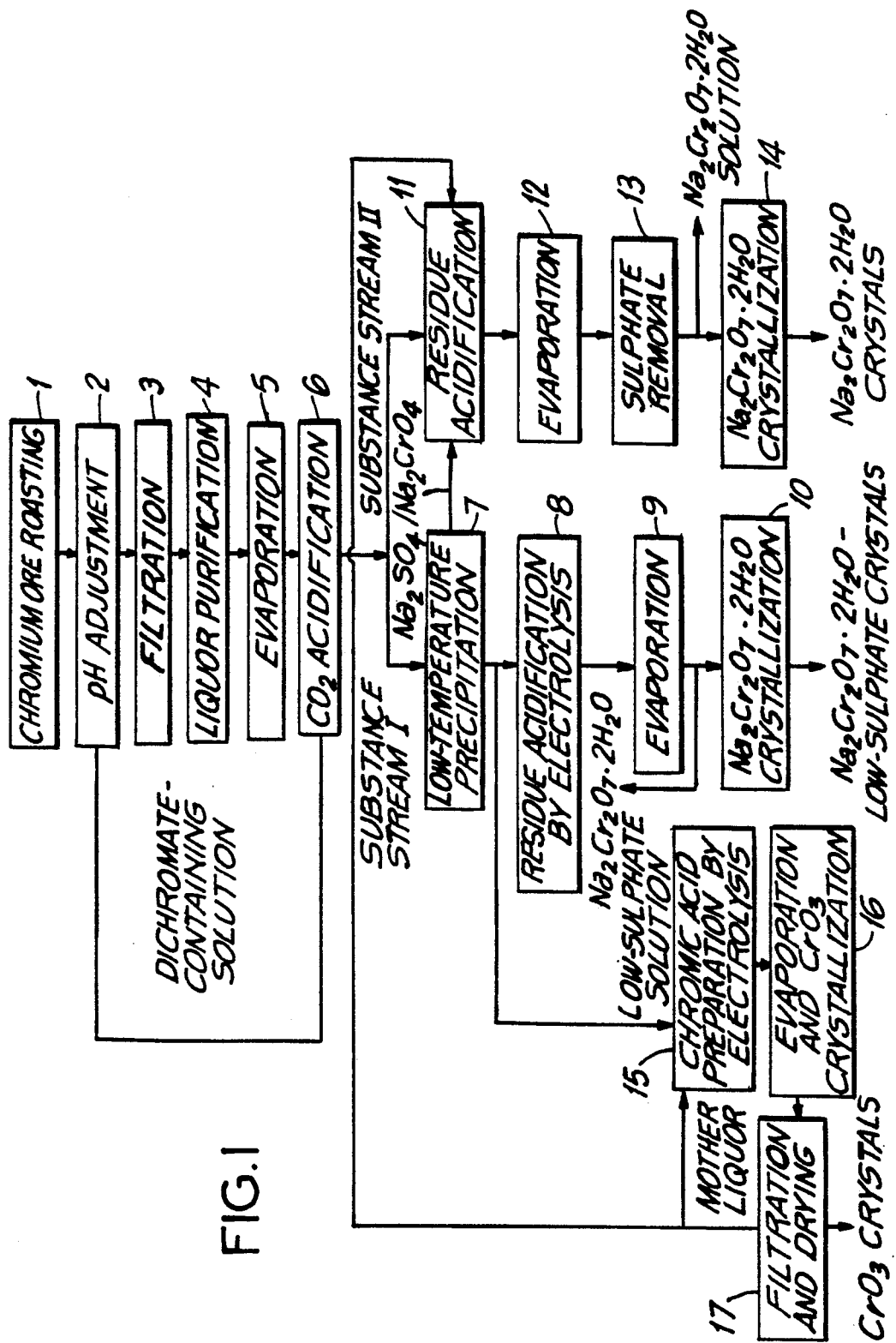

Chromium ore is digested by oxidative roasting with sodium carbonate and atmospheric oxygen under alkaline conditions at 1000° to 1100° C. in the presence of a leaning agent in a rotary tubular furnace (1). The roast formed in the procedure is then leached with water or dilute chromate solution and brought to a pH of between 7 and 9.5 with solution containing sodium dichromate (2). In this procedure, soluble alkali compounds of iron, aluminum and silicon are converted into insoluble hydroxides or hydrated oxides which are easy to filter, and these are removed together with the insoluble constituents of the roast (3). The sodium monochromate solution formed containing 300 to 500 g/l of $Na_2CrO_4$ is then freed from dissolved vanadate, as described in EP-A-47,799, by addition of calcium oxide at a pH of 10 to 13. The solution which now contains calcium is freed from the majority of the alkaline earth metal ions and other polyvalent cations by precipitation as carbonates by addition or in situ generation of sodium carbonate (4). The precipitation here is preferably carried out at temperatures of 50° to 100° C. at a pH of between 8 and 12 using an approximately 2- to 10-fold molar excess of carbonate, based on the amount of alkaline earth metal ions. After the filtration, a sodium monochromate solution which has been freed from polyvalent cations down to a value, taken together, of less than 5 mg/l is obtained. The content of polyvalent cations in this solution can be reduced still further with the aid of suitable selective cation exchangers. The sodium monochromate solution is then concentrated to contents of 750 to 1000 g/l of $Na_2CrO_4$ by evaporation in one or more stages (5).

A pH of less than 6.5 is established in the now concentrated solution by adding carbon dioxide, in one or more stages, up a final pressure of 4–15 bar at a final temperature of not more than 50° C., and 80 to 90% conversion of the sodium chromate into sodium dichromate is in this way achieved, sodium bicarbonate being precipitated (6).

The sodium bicarbonate is removed from the resulting suspension, under a continuing carbon dioxide pressure, or after the pressure has been let down the sodium bicarbonate is removed rapidly before reacting back with the sodium dichromate.

The resulting sodium monochromate/sodium dichromate solution separated off from the sodium bicarbonate is now divided into two streams of substance, after removal of a part stream for the pH adjustment of the leached roast. Substance stream I demonstrates the preparation of sodium dichromate solutions strates the preparation of sodium dichromate solutions and crystals which have been essentially freed from sulphate; substance stream II describes the preparation of sodium dichromate solutions and crystals in the customary industrial quality.

The sodium dichromate solution of substance stream I is cooled to $-5°$ to $-20°$ C. in a vessel equipped with a stirrer, and after a residence time of 5 to 60 minutes is freed from the sodium sulphate precipitated by filtration (7). In this process step, the majority of the sodium monochromate of the solution also precipitates out, in addition to the sodium sulphate, a solution containing less than 0.03% by weight of sodium sulphate and less than 3% by weight of sodium chromate being obtained. In addition to the effect of removal of sulphate, acidification of the solution by precipitation of sodium monochromate is accordingly also achieved during cooling, as a rule solutions in which 98 to 99% of the chromate is present as dichromate being obtained. In the solution now obtained, the monochromate contents are converted electrolytically into dichromate (8). For this, the solution is introduced into the anode chambers of electrolysis cells provided with cation exchanger membranes at a speed such that the monochromate contents are converted completely into dichromate. An alkaline solution containing sodium ions, for example a sodium hydroxide solution, is obtained in the cathode chambers of the electrolysis cells, with evolution of hydrogen. This solution is employed, if appropriate after concentration, in the purification of the sodium monochromate solution (4) and in the preparation of sodium carbonate from the sodium bicarbonate formed during the carbon dioxide acidification.

The resulting sodium dichromate solution, which has largely been freed from sulphate, can now be used for various intendeded uses, for example oxidations of organic substances, if appropriate after concentration to about 60 to 70% by weight of $Na_2Cr_2O_7.2H_2O$.

To prepare sodium dichromate crystals, the solution is evaporated to about 1650 g/l (9) and then cooled to 30° to 40° C. (10). Sodium dichromate in this way precipitates in the form of $Na_2Cr_2O_7.2H_2O$ crystals containing only small amounts of sulphate. It is advantageous for the evaporation of the solution and the sodium dichromate crystallization to be carried out continuously. The crystals are then separated from the mother liquor in centrifuges and dried at temperatures of about 70° to 85° C.

The residue from the low-temperature precipitation (7), containing sodium sulphate and sodium monochromate, in substance stream I is mixed with the sodium dichromate solution of substance stream II—if appropriate after making into a mash with water—and is fed together with this to the residue acidification (11). This residue acidification can be carried out, for example, by electrolysis and/or by addition of sulphuric acid. If, as shown in FIG. 1, the preparation of sodium dichromate is associated with the electrolytic preparation of chromic acid, some of the mother liquor from the chromic acid filtration (17) can also be used for complete or partial residue acidification. The solution obtained after the residue acidification (11) is then concentrated to about 60 to 70% by weight of $Na_2Cr_2O_7.2H_2O$ for generation of sodium dichromate solution and is freed from the sodium sulphate which has precipitated, for example using pressure suction filters (13). To prepare sodium dichromate crystals, the solution is concentrated to about 1650 g of $Na_2Cr_2O_7.2H_2O$, freed from the sodium sulphate which has precipitated by filtration with suction under pressure and worked up to sodium dichromate crystals of standard industrial quality analogously to substance stream I (14).

For electrolytic preparation of highly pure chromic acid, the sodium dichromate solution of substance stream (I) is converted, after the low-temperature precipitation (7), into a solution containing chromic acid in a multi-stage electrolysis at 50° to 90° C. in two-chamber electrolysis cells with cation-selective membranes as the separating walls (15). The electrolysis is carried out here so that the solution mentioned is introduced into the anode chamber of the first stage and, after partial conversion of the dichromate into chromic acid, then flows into the second stage, which effects partial further conversion into chromic acid, and is in this way passed further in stages up to the last stage, in which a degree of conversion of the dichromate into chromic acid of 55–70%, corresponding to a molar ratio of sodium ions to chromic acid of 0.45:0.55 to 0.30:0.70, is achieved. Any desired number of stages can be chosen, a 6- to 15-stage electrolysis being preferred.

The solution containing chromic acid formed in the electrolysis and a residue of sodium dichromate is brought to a water content of about 12 to 22% by weight of water by evaporation at temperatures between 55° and 110° C., the majority of the chromic acid crystallizing out (16). The suspension formed is then separated by centrifugation at 50° to 110° C. into a solid essentially consisting of crystalline chromic acid and a liquid phase, called the mother liquor below (17).

The resulting mother liquor is recycled, if appropriate after dilution with water, into the electrolysis at a suitable point, i.e. into a stage with the most similar degree of dichromate conversion. In order to avoid high enrichment of impurities in the system, some of the mother liquor is sluiced out and used in the residue acidification in substance stream II. The crystalline chromic acid is freed from adhering mother liquor by washing once or several times with 10 to 50% strength by weight, based on the weight of the solid, of saturated or virtually saturated chromic acid solution and by centrifugation following each of the washing operations. The washed pure chromic acid crystals can now be put to their use directly or after drying.

The process according to the invention is illustrated with the aid of the following examples.

EXAMPLES

Sodium chromate solutions which had been prepared by dissolving sodium dichromate crystals from a typical large-scale industrial process were used in Examples 1 to 6. The sodium monochromate contents stated in the individual examples were established in these solutions by addition of sodium hydroxide or by addition of sodium monochromate. A partly acidified sodium chromate solution which had been obtained in a large-scale industrial process after acidification with carbon dioxide was employed in Example 7.

Example 1

In this example, in each case 200 ml of sodium chromate solution in which about 90% of the sodium chromate were present as sodium dichromate were used, the solution having the following composition:

| $Na_2Cr_2O_7.2H_2O$ | 48.4% by weight |
|---|---|
| $Na_2CrO_4$ | 5.7% by weight |
| $SO_4^{2-}$ | 0.33% by weight |
| Total chromate content of the solution (expressed in $Na_2Cr_2O_7.2H_2O$ equivalents) | 53.6% by weight |

This solution, which approximately corresponds in its composition to a solution such as is obtainable after acidification with carbon dioxide, was cooled to 0°, −5°, −10° and −20° C., stirred at the temperature mentioned for 60 minutes and then filtered at the particular temperatures using a glass frit. The results of the experiment are summarized in Table 1.

TABLE 1

| Temperature | Concentration of $Na_2Cr_2O_7.2H_2O$ | Concentration of $Na_2CrO_4$ | Degree of acidification* | Concentration of $SO_4^{2-}$ |
|---|---|---|---|---|
| 0° C. | 48.1% by weight | 5.8% by weight | 90% | 3300 ppm |
| −5° C. | 52.6% by weight | 2.6% by weight | 95.7% | 200 ppm |
| −10° C. | 53.6% by weight | 1.7% by weight | 97.1% | 180 ppm |
| −20° C. | 53.9% by weight | 0.7% by weight | 98.8% | 84 ppm |

*The so-called degree of acidification indicates how many % of the total chromate content, calculated as $Na_2Cr_2O_7.2H_2O$ equivalents, are present in the solution as dichromate.

According to Table 1, the sulphate content could be decreased from 3300 ppm down to 84 ppm of $SO_4^{2-}$, or 0.023% by weight of $Na_2SO_4$, based on the total chromate content of the solution, by cooling the solution. In addition, the degree of acidification has risen from 90 to 98.8%.

Example 2

In each case 200 ml of a sodium chromate solution of the following composition were cooled to 0°, −10° and −25° C., stirred and filtered:

| $Na_2Cr_2O_7.2H_2O$ | 48.8% by weight |
|---|---|
| $Na_2CrO_4$ | 10.3% by weight |
| $SO_4^{2-}$ | 0.57% by weight |
| Total chromate content ($Na_2Cr_2O_7.2H_2O$ equivalents) | 58.3% by weight |

The degree of acidification of this solution was 83.7%. Table 2 shows the results of the experiment.

TABLE 2

| Temperature | Concentration of $Na_2Cr_2O_7.2H_2O$ | Concentration of $Na_2CrO_4$ | Degree of acidification | Concentration of $SO_4^{2-}$ |
|---|---|---|---|---|
| 0° C. | 59.1% by weight | 3.2% by weight | 95.3% | 320 ppm |
| −10° C. | 62.0% by weight | 1.3% by weight | 98.3% | 130 ppm |
| −20° C. | 61.9% by weight | 0.6% by weight | 99.1% | 60 ppm |

Example 3

In each case 200 ml of a sodium chromate solution with a degree of acidification of 85% and the following composition were cooled to 0°, −5°, −10° and −15° C. and worked up as described in Example 1.

| $Na_2Cr_2O_7.2H_2O$ | 41.8% by weight |
|---|---|
| $Na_2CrO_4$ | 8.0% by weight |
| $SO_4^{2-}$ | 0.46% by weight |
| Total chromate content ($Na_2Cr_2O_7.2H_2O$ equivalents) | 49.2% by weight |

The results are shown in Table 3.

TABLE 3

| Temperature | Concentration of $Na_2Cr_2O_7.2H_2O$ | Concentration of $Na_2CrO_4$ | Degree of acidification | Concentration of $SO_4^{2-}$ |
|---|---|---|---|---|
| 0° C. | No precipitation | | | |
| −5° C. | No precipitation | | | |
| −10° C. | 48.0% by weight | 2.0% by weight | 96.3% | 110 ppm |
| −15° C. | 47.9% by weight | 2.0% by weight | 96.2% | 80 ppm |

Example 4

The sodium chromate solution employed in this example had the following composition, at a degree of acidification of 90%:

| $Na_2Cr_2O_7.2H_2O$ | 53.0% by weight |
|---|---|
| $Na_2CrO_4$ | 6.4% by weight |
| $SO_4^{2-}$ | 0.28% by weight |
| Total chromate content ($Na_2Cr_2O_7.2H_2O$ equivalents) | 58.9% by weight |

In each case 200 ml were cooled to 0°, −5°, −10°, −15° and −20° C. and worked up as described.

The results are shown in Table 4.

TABLE 4

| Temperature | Concentration of $Na_2Cr_2O_7.2H_2O$ | Concentration of $Na_2CrO_4$ | Degree of acidification | Concentration of $SO_4^{2-}$ |
|---|---|---|---|---|
| 0° C. | No precipitation | | | |
| −5° C. | No precipitation | | | |
| −10° C. | 57.9% by weight | 1.2% by weight | 98.1% | 90 ppm |
| −15° C. | 58.0% by weight | 0.8% by weight | 98.8% | 50 ppm |
| −20° C. | 58.7% by weight | 0.6% by weight | 99.1% | 40 ppm |

Example 5

200 ml of a 59.1% strength sodium dichromate solution with a low sodium monochromate content of 0.02% by weight and a sulphate content of 0.29% by weight of $SO_4^{2-}$ were cooled to 0°, −5°, −10°, −15° and −20° C. and stirred at the particular temperatures for one hour.

Precipitation, that is to say also no decrease in the sulphate content of the solution, occurred at none of the temperatures mentioned.

Example 6

200 ml of a sodium chromate solution of the following composition were cooled to −20° C., stirred and filtered over a glass frit.

| | |
|---|---|
| $Na_2Cr_2O_7.2H_2O$ | 53.0% by weight |
| $Na_2CrO_4$ | 6.4% by weight |
| $SO_4^{2-}$ | 0.29% by weight |

The monochromate contents of the filtered solution were subsequently converted into dichromate by bringing the pH to pH 3.8 by means of solid chromic acid.

The solution containing 75 ppm of sulphate was concentrated to about 90% by weight of $Na_2Cr_2O_7.2H_2O$ by evaporating off water and cooled to 80° C. During this procedure, sodium dichromate precipitates in the form of $Na_2Cr_2O_7.2H_2O$ crystals. After filtration and drying at 75° C., the crystals had a residual sulphate content of 80 ppm of $SO_4^{2-}$ or 0.012% by weight of $Na_2SO_4$.

Example 7

In each case 200 ml of a technical grade sodium chromate solution acidified to the extent of 93% and having the following composition were cooled to 0°, −10°, −15° and −20° C. and worked up as described in Example 6:

| | |
|---|---|
| $Na_2Cr_2O_7.2H_2O$ | 54.7% by weight |
| $Na_2CrO_4$ | 4.5% by weight |
| $SO_4^{2-}$ | 0.934% by weight |
| Total chromate content of the solution ($Na_2Cr_2O_7.2H_2O$ equivalents) | 58.8% by weight |

The pH of this solution was 5.9.
The results of the experiment are summarized in Table 5.

TABLE 5

| Temperature | Concentration of $Na_2Cr_2O_7.2H_2O$ | Concentration of $Na_2CrO_4$ | Degree of acidification | pH | Concentration of $SO_4^{2-}$ |
|---|---|---|---|---|---|
| 0° C. | 57.0% by weight | 2.6% by weight | 96.0% | 5.7 | 1900 ppm |
| −5° C. | 57.7% by weight | 2.0% by weight | 96.9% | 5.6 | 660 ppm |
| −10° C. | 59.4% by weight | 1.3% by weight | 98.0% | 5.4 | 320 ppm |
| −15° C. | 59.8% by weight | 1.0% by weight | 98.5% | 5.2 | 200 ppm |
| −20° C. | 60.2% by weight | 0.7% by weight | 98.9% | 5.0 | 100 ppm |

What is claimed is:

1. A process for the preparation of sodium dichromate and sodium dichromate solutions comprising:
    (1) alkaline oxidizing roasting chromium ores to yield a roast;
    (2) leaching the roast with water to yield a mash;
    (3) adjusting the pH of the mash to 7 to 9.5;
    (4) filtering the mash to remove insoluble constituents to yield a sodium monochromate solution;
    (5) converting the monochromate ions in the sodium monochromate solution into dichromate ions to yield a sodium dichromate solution by a process consisting of the following steps (5a)-(5e):
    (5a) concentrating the sodium monochromate solution from an initial concentration of 300 to 500 g/l of $Na_2CrO_4$ to a final concentration of 700 to 1000 g/l of $Na_2CrO_4$;
    (5b) converting 75 to 95% of the monochromate ions in the solution resulting from step (5a) into dichromate ions by the addition of an acid or by electrolysis or by reaction with carbon dioxide under pressure to yield a solution containing both monochromate ions and dichromate ions;
    (5c) cooling the solution resulting from step (5b) to a temperature of −5° C. to −25° C.; then
    (5d) filtering the solution resulting from step (5c) to remove those sulfates precipitating as a result of steps (5a)-(5c); and
    (5e) converting residual monochromate ions in the solution resulting from step (5d) into dichromate ions by the addition of chromic acid or by electrolysis or by reaction with carbon dioxide to yield the sodium dichromate solution, said conversion of residual monochromate ions into dichromate ions being carried out optionally after concentration of the solution resulting from step (5d); and then
    (6) either recovering a sodium dichromate solution or crystallizing sodium dichromate by concentration of the sodium dichromate solution to produce sodium dichromate.

2. Process according to claim 1, which comprises in step (5d) converting 80 to 95% of monochromate ions in the solution resulting from step (5a) into dichromate ions.

3. Process according to claim 2, which comprises in step (5b) converting 80 to 95% of monochromate ions in the solution resulting from step (5a) into dichromate ions by reaction with carbon dioxide under pressure.

4. Process according to claim 3, which comprises in step (5e) converting residual monochromate ions in the solution resulting from step (5d) into dichromate ions by electrolysis.

5. Process according to claim 1, which comprises removing polyvalent cations and vanadium after step (4).

6. Process according to claim 1, wherein step (5e) is carried out after concentration of the solution resulting from step (5d).

7. Process according to claim 1, which further comprises converting the sodium dichromate solution recovered in step (6) into chromic acid by electrolysis.

* * * * *

UNITED STATES PATENT AND TRADEMARK OFFICE
CERTIFICATE OF CORRECTION

PATENT NO. : 5,273,735
DATED : December 28, 1993
INVENTOR(S) : Weber, et al.

It is certified that error appears in the above-indentified patent and that said Letters Patent is hereby corrected as shown below:

Col. 10, line 37    Delete " (5d) " and substitute -- (5b) -

Signed and Sealed this

Eighteenth Day of March, 1997

Attest:

BRUCE LEHMAN

*Attesting Officer*    *Commissioner of Patents and Trademarks*